3,062,772
NON-SCORCHING POLYURETHANE COMPOSITIONS AND METHOD OF MAKING SAME
Orin C. Keplinger, Otto C. Elmer, and Joe S. Duncan, Akron, Ohio, assignors to The General Tire & Rubber Company, Akron, Ohio, a corporation of Ohio
No Drawing. Filed June 5, 1957, Ser. No. 663,624
11 Claims. (Cl. 260—40)

This invention relates to polyurethane polymeric compositions. It particularly relates to curable rubbery and rigid polyurethane polymers and to a method of preparing said polymers.

The high polymers of polyurethanes, and particularly those which are predominantly composed of linear molecules, have wide commercial possibilities; but, their utilization has been greatly retarded because of the fact that they can be stored compounded ready for cure and for application to tires, etc., for only limited periods of time before they are processed into a final article. When additives and reinforcers are masticated and mixed with the elastomer on a rubber mill, the rubbers may "scorch" or vulcanize prematurely.

The long-chain polyurethane polymers, particularly the linear polyurethane rubbery polymers, are prepared by reacting one or more generally linear polyols such as polyesters or polyethers having hydroxy end groups or a combination of these materials with one or more organic diisocyanates. In the preparation of these materials, the diisocyanate links polyester and/or polyether molecules together into long chains, and also excess isocyanate over that which is required to react with the polyester molecules in a molar 1:1 ratio remains in the polymer to act as a curing or crosslinking agent, which changes the plastic linear molecules to a nonplastic, crosslinked network.

It has been considered necessary to utilize a very substantial excess of isocyanate to provide curing properties in the polyurethane polymers. The excess isocyanate reacts not only at elevated temperatures but also reacts relatively rapidly at room temperatures, so that the plastic urethane polymers generally must be prepared and compounded with great care. Even when such care is taken, substantial "scorchiness" cannot always be prevented. This results in a marked disadvantage and has prevented the substantial use of the polyurethane polymers, particularly the linear polyether and polyester rubbers, in the manufacture of complex articles, such as pneumatic tires and the like.

In order to overcome storing "setup" after the preparation of the polymer, it has been proposed to manufacture the polyurethane polymer with a deficiency or a very slight excess of isocyanate and to later add the substantial excess isocyanate required for curing just before it is desired to use the article, such as described in British Patent No. 694,978. With this two-step addition, there is some indication that the quality of the cured polymer is not as high as that formed with a one-step addition of substantial excess. Properties desired in rubbery composition used for tires, belting and the like such as tensile strength and elongation are not as good as desired. Such procedure, while somewhat better than adding all of the isocyanate initially as far as preventing "set up" upon storage, still is disadvantageous in that the materials are scorchy and very difficult to handle in preparing articles because reaction with isocyanate for crosslinking occurs not only at elevated temperatures but also at normal temperatures at a very rapid rate.

It is an object of the present invention to provide polyurethane compositions which may be compounded ready for curing and stored for substantial periods, which may be milled without scorching, and which may be vulcanized by merely subjecting the compositions to elevated temperature and pressure without adding substantially additional isocyanate or other material after the required storage period.

It is an object to provide polyurethane compositions which can be milled with ordinary care such as employed with natural rubber compositions and without substantial scorching.

It is another object of the present invention to provide a method of making such compositions.

It is an object to provide rubbery polyurethane compositions which can be prepared, stored without appreciable curing and milled with curing agents without appreciable scorch or incipient vulcanization during the mixing period on the mill, and again stored without setup or decomposition for prolonged periods prior to vulcanization.

Carbon black, when added to ordinary synthetic rubbers, has marked beneficial effects, both in increasing the strength and increasing the abrasion and cut resistance of the article. When added to the rubbery linear polyurethanes, carbon black has been considered to have quite the opposite effect in that it ordinarily decreases the desirable properties of the resultant polymer.

It is a further object of the present invention to provide polyurethane base compositions which can be milled without scorching and compounded with carbon black to give rubbery products having good properties.

The present invention provides an elastic polyurethane composition and method for preparing the same which comprise reacting linear polyesters and/or polyethers with an organic diisocyanate mixture, a minor portion of which is durene diisocyanate (2,3,5,6-tetra methyl para phenylene diisocyanate). Surprisingly, even when the total amount of diisocyanate used compared to the polyether or polyester is slightly over a 1:1 molar ratio, such polymers are readily storable and millable without appreciable scorching or premature cross-linking of the polymer. Scorching may be defined as a decrease in thermoplastic properties due to incipient vulcanization, which results in a lack of building tack and greatly hinders subsequent processing such as calendering, extruding or molding.

Based on one weight equivalent of diol or other active hydrogen compound, the amount of durene diisocyanate used is preferably about .05 to .10 equivalent and the balance of the polyisocyanate (preferably diisocyanate) mixture is preferably about .95 to .99 equivalent which may be durene diisocyanate or any organic diisocyanate as hereinafter described. Polyurethane compositions with good resistance to scorch as well as other desirable processing properties similar to natural rubber may be obtained when the amount of durene diisocyanate is from .02 to .25 weight equivalent and the balance of the total polyisocyanate mixture is from .80 to .99 weight equivalent. Thus in accordance with the present invention, the total amount of diisocyanate used in the composition prior to curing is about 1.01 to 1.3 isocyanate groups for each active hydrogen although up to 1.4 or even 1.5 equivalents of isocyanates may be present for each equivalent of active hydrogen when shaping operations which do not require a calenderable material are utilized. When the weight equivalent of the isocyanate is above 1.3 for each equivalent of active hydrogen-containing compound, the resultant polyurethane is usually too soft for calendering operations.

Many properties of rubbery materials used for tires, belting and similar articles are important such as resistance to dynamic fatigue, resistance to scorch, resistance to abrasion tensile strength, modulus and elongation. In order to obtain about the best balance of the latter named physical properties, as well as obtain excellent scorch resistance, the equivalent ratio of total diisocyanate used to polyol should be such that there are about 1.04/1 to 1.15/1. When the total moles of diisocyanate is more than about 1.30 even though the maximum amount of durene diisocyanate is used or all the diisocyanate is durene diisocyanate, there apparently are too many —NCO groups which then terminate the polymer chain before they can achieve a millable consistency. The lower range of total amount of diisocyanate that must be present is about 1.01 equivalents per equivalent of polyol.

While all the diisocyanate is preferably premixed with the polyol to obtain the best physical properties, the durene diisocyanate may be added to the urethane elastomer after its preparation and before curing. Thus the polymer may be formed with about equal moles of diisocyanate and active hydrogen containing compound, and the durene diisocyanate added prior to the curing step.

In the copending application Serial No. 535,280, filed September 19, 1955, of Gruber and Keplinger, it is disclosed that urethane polymers having a slight excess about 6 to 15% of diisocyanate to diol over a 1:1 molar ratio, may be compounded with carbon black and cured preferably with a dialkyl peroxide curing agent to provide valuable rubbery compositions having desirable properties such as good storability and excellent hot tensile strength. However, such rubbers were deficient in resistance to scorch during milling and in low De Mattia flexing test performance. When the diisocyanate was substituted in part by durene diisocyanate so that the usually used diisocyanate was not appreciably in molar excess and the durene diisocyanate was sufficient to account for all molar excess of isocyanate over polyol, resistance to scorching was remarkably increased even though a dialkyl peroxide curing agent such as dicumyl peroxide (2,2-bis-(2-phenyl) peroxy propane) was still present. The product also had decreased De Mattia flex crack growth. At the same time, better Goodrich flexometer performance resulted.

The organic peroxides apparently withdraw hydrogen atoms from activated methylene groups of polyols to form free radicals in their respective chains which can crosslink the molecular chains together. The peroxide curing agents are disclosed in the copending application Serial No. 535,280 above and are of the general formula R'—O—O—R where R and R' are substituted and unsubstituted organic groups including alkyl, aralkyl and such groups containing one or more nonfunctional groups and/or alkyl groups and substitutes. The R and R' groups preferably contain an aliphatic group of at least 2 carbon atoms attached directly to a peroxide oxygen atom. While the best results are obtained with dicumyl peroxide, other preferred peroxide type-curing agents are ditertiary butyl peroxide, di-2,2-bis-(t-butyl) peroxy butane, chlorine substituted dialkyl peroxides such as 2,2-bis-(dichlorophenyl) isopropyl peroxide. Also effective in carbon black-polyurethane elastomers are isopopyl peroxide, methyl cumyl peroxide, cymyl cumyl peroxide, t-butyl cumyl peroxide and 1-isobutoxy-1-cumyl peroxy ethane.

For non-black stocks, suitable peroxides are t-butyl perbenzoate, lauroyl peroxide, or benzoyl peroxide may also be used. The peroxides are preferably used in amounts etc. of 0.5 to 8 percent by weight of the polyurethane.

When an organic peroxide is used for the main curing agent, the total amount of diisocyanate used per mole of total polyol used may be less than when no peroxide is used and is preferably in the range of 0.97 to 1.04 moles. Generally the range of total diisocyanate used should be at least 0.95 mole and no more than 1.3 moles.

It has also been dicovered that excellent polyurethane compositions with unusually good low temperature properties as well as high temperature stability can be prepared when the polyol is an ester of (1) a dicarboxylic acid as previously described and preferably adipic and isosebacic or isopthalic acids and (2) a butylene or poly butylene-1,4 glycol along with another alklene glycol of a different number of carbon atoms such as propylene glycol, and preferably ethylene glycol. When butylene-1,4 glycol is present in more than 30 mole percent of the total glycol used such as in 60/40 poly (ethylene-butylene) adipate, a resultant polyurethane elastomer from a reaction of the polyester with a polyisocyanate such as p,p'-diisocyanato diphenyl methane may be cured very satisfactorily with only half the amount of dialkyl peroxide previously required.

As a further improvement in these compositions, at least a small amount of durene diisocyanate used as herein described provides a non-scorching composition and yet the advantages of ease of cure as well as excellent low temperature properties, such as a brittle point of below —70° C. are retained.

The "active hydrogen containing compound" is preferably a substantially linear polyol having a molecular weight of at least 500 and for best results should be terminated with hydroxyl groups or at least principally with hydroxyl groups although useful products can also be made when a substantial amount of end groups contain other active hydrogen atoms such as those in amino groups. Examples of polyols are hydroxy terminated polyesters and polyethers such as poly (ethylene-propylene) adipate, poly (ethylene-butylene) adipate, the adipate of mixed poly (ethylene and butylene-1,4 ether) glycols which glycols may contain from 2 to a 100 or so alkoxy units, and polytetramethylene ether glycol. The molecular chain of the polyol extending between terminal hydroxyl groups may contain only carbon, hydrogen and oxygen, or these elements and nitrogen. Carbon to carbon bonds may be saturated or in part unsaturated although this is not essential for cure by either an isocyanate or peroxide. While some unsaturated carbon to carbon linkages may be present, the carbon to carbon linkages are preferably aliphatically saturated, i.e. not of the aliphatically unsaturated type double bond.

The linear urethane polymers of the present invention have recurring units of the following formula formed from part or all of the diisocyanate present:

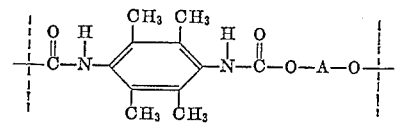

In the formula —O—A—O— is a residue of a hydroxy terminated polyol reacted with durene diisocyanate.

In order to make rubber urethanes, i.e., those which are rubbery at normal temperatures, the molecular weight of the polyesters and of the polyethers prior to reaction with the polyisocyanate is quite important. Also, in order to provide polyesters for linear rubbery polymers of the solid nonporous type, the low acid number linear polyesters and polyethers are desirable. Acid numbers in polyesters of less than one give products which are superior, although we can, in accordance with the present invention, use polyesters with a much higher acid number, even to the range of an acid number of 60. The molecular weight of the polyesters should, for the preparation of rubbery polyurethane polymers, be above 500 and preferably above 1000. The maximum molecular weight of the polyester is dependent only upon the ability to economically make the polyesters of higher molecular weights, the higher molecular weights being preferred. Generally, it is exceedingly difficult to obtain polyesters with a molecular weight much above 3000 or 4000 without substantially higher costs.

The polyethers used for preparing the improved polyurethane compounds containing no ester linkages should have a molecular weight of at least 600 and preferably more; if materials rubbery at normal temperatures are desired, molecular weights of over 1000 are preferred.

When the molecular weight of the polyether used for reacting with the isocyanates is less than 500 or 600, the product, while plastic, is usually too rigid for application as rubbery base materials at ordinary temperatures. However, according to this invention, rigid polyurethanes may also be cured. When the polyethers and polyesters, for example, have molecular weights under 1000 and preferably under 500 to 600, rigid-type linear polyurethanes are formed which may also be advantageously cured using the methods of this invention.

Rigid polyurethanes may also be produced by increasing the amount of cross-linking in the resultant polyurethane, for instance, by using a cross-linking or branching agent, such as trimethylol propane, glycerol, pentaerythritol or by using polyesters or polyethers of the cross-linking type.

The preferred polyethers for polyurethane elastomers are mixed poly (ethylene-propylene) ether glycols, and polytetramethylene ether glycol of a molecular weight of over 1000. Desirable properties for the polyethers are curing sites, a very low acid number or no acid number and hydroxyl groups on the ends of the molecular chain.

Examples of suitable polyethers for isocyanate curing are those from the class of polyalkylene ether glycols, such as polyethylene glycol ("Carbowax," having a molecular weight of about 1000), polypropylene glycol, polytetramethylene ether glycol, polytrimethylene ether glycol, polyneopentylene ether glycol, polypentamethylene ether glycol, preferably having a molecular weight of above 600 and preferably of about 2000 to 4000 and mixed polyalkylene ether glycols such as poly (ethylene-propylene) ether glycol and poly (ethylene-butylene) ether glycols.

Suitable polyesters for use under the invention are any polyesters containing ethylene, propylene and/or pentylene groups or mixtures thereof or any linear polyester containing active methylene groups. The above active methylene groups apparently react in the curing or cross-linking by the above described peroxides described in this invention. Any dibasic acid may be used for esterifying the glycol but adipic, sebacic, isosebacic, succinic, glutaric and dimer acid are generally used and are superior to the aromatic acids for rubbery products.

As low a molecular weight as 500 and as high a weight as 3000 or 4000 or more for these linear polyesters can be utilized. They should, as aforementioned, be dihydroxy terminated and have an acid number preferably under 1, although an acid number up to 60 can be utilized.

The following description in which parts are by weight unless otherwise stated, illustrates the preparation of poly esters suitable for use in making rubbery linear polyurethane curable in accordance with the present invention:

A suitable polyester used as a base material for reaction with the diisocyanate in accordance with this invention, for example, can be prepared as follows:

Ethylene glycol (6.7 mols) and propylene glycol (3.3 mols) may be stirred together and charged into a reaction vessel with 8.4 mols of adipic acid. The mixture is heated and refluxed to remove water and excess glycol. The reaction is stopped when the molecular weight of the linear polymer product is about 2000, the acid number is under 1 and the viscosity is 500 cps. at 73° C.

Any readily reactive organic diisocyanate having two and only two readily reactive isocyanate groups may be used for reacting with the polyester or polyether, providing at least some of the total polyisocyanate content or at least the major portion of the molar excess prior to milling is durene diisocyanate. Diisocyanates having both isocyanate groups of about equal reactivity are preferred for at least part of the total isocyanate present to facilitate growth of the polyurethane chains and the amount of durene diisocyanate is preferably more than the molar excess if all the main benefits of the invention are to be obtained. Tri-functional isocyanates like tri-functional polyesters act as cross-linking agents and are undesirable in appreciable quantity unless one of the functional groups is relatively non-reactive.

Various aliphatic and/or aromatic diisocyanates are commercially available and the following is a partial list:

(1) Toluene-diisocyanate
(2) p,p'-diisocyanato diphenyl methane
(3) Naphthalene-1,5-diisocyanate
(4) Bi-tolylene diisocyanate
(5) Di-anisidine diisocyanate
(6) Paraphenylene diisocyanate
(7) Metaphenylene diisocyanate
(8) Meta xylylene diisocyanate
(9) Benzidine diisocyanate
(10) Mexamethylene diisocyanate In making the polyurethanes, the diisocyanate and polyesters and/or polyethers are mixed together and allowed to polymerize at any suitable temperature, preferably at a temperature of about 115° C. or 100° to 140° C. for a period as short as 15 minutes, although about six hours is preferred. Polymerization at room temperature requires a much longer time.

Carbon black milled in at a ratio of as low as 5 or 10 up to 60 or even as high as 80 parts by weight has been found surprisingly to impart to the polyurethane rubbers superior properties, such as improved tensile, tear, wear and abrasion resistance. In order to obtain the best balance of desired rubbery properties, about 15 to 50 parts by weight of carbon black per 100 parts of polyurethane are used. Other dry pigments such as clay, calcined HiSil, or calcium carbonate may be substituted for part or all of the black to give vulcanizates with useable properties, although the carbon black stocks have been found to be considerably superior.

After compounding and milling, the polyurethanes are cured, generally from 10 to 120 minutes at approximately 35 to 75 pounds' stream pressure.

EXAMPLE I

A linear long chain rubbery polyurethane was made by reacting equal moles of polytetramethylene ether glycol and TDI (2,4-tolylene diisocyanate). The reaction mixture was allowed to stand in a closed container for 6 hours at a temperature of 115° C. The resultant polymer was masticated on a rubber mill with the following ingredients to form a series of homogeneous mixtures, as indicated below:

|  | Parts by weight | | | |
| --- | --- | --- | --- | --- |
|  | A | B | C | D |
| Polyurethane | 100 | 100 | 100 | 100 |
| Carbon black, EPC | 15 | 15 | 15 | 15 |
| 4-tertiary butyl 2,6-tolylene diisocyanate | 5 | | | |
| m, m'-Dimethyl p,p'-diisocyanato diphenyl methane | | | 6 | |
| Durene diisocyanate (2,3,5,6-tetramethyl para phenylene diisocyanate) | | 5 | | |
| PAPI-1 (polyaryl polyisocyanate) | | | | 6.25 |

NOTE.—PAPI-1 is a dark somewhat viscous liquid aromatic polyisocyanate containing both ortho and para substitution according to the formula:

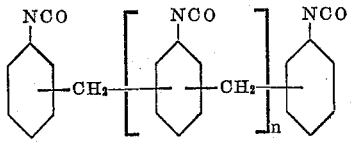

where $n$ has an average value of 1.

The molecular weight is about 384 and the average number of isocyanate groups per molecule is 3.03.

*Table I*

| Cure | A<br>p-t-Butyl<br>2,6, TDI | B<br>Durene diisocy-anate | C<br>Dimethyl MDI (DMN) | D<br>PAPI-I polyaryl isocyanate |
|---|---|---|---|---|
| Pts./100 parts polyurethane | 5 | 5 | 6 | 6.25 |
| Modulus | 1,200 | 1,165 | 1,088 | 1,475 |
| Tensile | 4,800 | 3,531 | 3,931 | 3,650 |
| Elongation | 610 | 690 | 710 | 550 |
| In hot water (205° F.): | | | | |
| Modulus | 482 | 788 | | |
| Tensile | 621 | 1,343 | 872 | 721 |
| Elongation | 600 | 850 | 275 | 225 |
| Shore hardness | 74 | 75 | 74 | 67 |
| Tear | 247 | 408 | 303 | 171 |
| Permanent set | 9 | 16 | 16 | 12 |
| De Mattia | 100,000 | 100,000 | 100,000 | 50,000 |
| Rebound (Bashore/Healey) | 42/65 | 43/65 | 48/66 | 51/68 |
| Compression set, percent | 38 | 40 | 30 | 24 |
| Aged 6 h./300° F. modulus | 1,100 | 1,450 | 1,460 | 1,150 |
| Tensile | 3,400 | 4,150 | 3,900 | 2,075 |
| Elongation | 700 | 620 | 640 | 550 |
| Durometer Shore A | 67 | 71 | 71 | 60 |

A Mooney scorch test was made on the rubbers in accordance with ASTM Test Designation: D1077–49T. The results shown in Table II, indicate that the durene diisocyanate-polyol rubber particularly, after about 15 minutes of testing, has outstanding processing properties hitherto not found in urethane polymers cured by excess isocyanate groups.

*Table II*

[Results of Mooney scorch test (30 minutes duration), ASTM Designation: D1077–49T, temperature of test, 250° F.]

| Time in minutes | 36.1<br>A | 36.2<br>B | 31.3<br>C | 36.11<br>D |
|---|---|---|---|---|
| 1.5 | 73 | 75.8 | 74.6 | 80.8 |
| 2.5 | | | | 79.5 |
| 4.0 | 60.8 | 62.5 | 62 | |
| 4.5 | | | | 76.8 |
| 5.0 | 60.8 | 61.5 | 61.5 | |
| 6.0 | 60 | 61.5 | 61.5 | |
| 6.3 | | | | 80 |
| 6.5 | | | | 84.4 |
| 7.0 | 60 | 60.8 | 61.5 | |
| 7.5 | | | | 87 |
| 8.0 | 59.3 | 60.8 | 61.5 | (¹) |
| 9.0 | 59.3 | 60 | 61.8 | |
| 10.0 | 59.3 | 60 | 61.8 | |
| 11.0 | 60 | 60 | 62.8 | |
| 12 | 60 | 60 | 62.8 | |
| 13 | 61.8 | 60 | 64 | |
| 14 | 62.8 | 60.8 | 64.5 | |
| 15 | 62.8 | 60.8 | 65 | |
| 16 | 64.2 | 60.8 | 66.1 | |
| 17 | 65 | 60.8 | 66.6 | |
| 18 | 65.8 | 61.4 | 66.6 | |
| 19 | 66.5 | 61.4 | 67 | |
| 20 | 68.5 | 61.4 | 70 | |
| 22 | 70 | 61.4 | 71.5 | |
| 25 | 75 | 63.5 | 78.5 | |
| 28 | 80 | 64.2 | 84.2 | |
| 30 | 84.2 | 65.5 | 87 | |

¹ No longer measured.

It is noted that composition B underwent a rise in Mooney of only 5 points from its minimum value in 30 minutes while compositions A and C underwent rises of about 10 points in 22 minutes.

The Mooney scorch test is recognized as method of determining, by using the shearing disk viscometer, the change in viscosity of rubbery materials which results from heating at a specific temperature. The time for incipient vulcanization to occur may be obtained from the measurements taken and the scorch time is usually defined as the time at which viscosity reaches a value of 5 units higher than the minimum.

The following example illustrates the fact that urethane polymers cured by durene diisocyanate are not only millable and processable without appreciable scorching but also cure better than other commercially available diisocyanates such as p,p′-diisocyanato diphenyl methane when used as an excess isocyanate-type curing agent.

EXAMPLE II

Polyurethane elastomers were prepared as in Example I by reacting the following amounts of polyol and diisocyanate:

| | Parts (moles) | | | | |
|---|---|---|---|---|---|
| | A | B | C | D | E |
| Polyol: Polyester 80/20 poly (ethylene-propylene) adipate (molecular weight, 2,000, viscosity 500 cps. at 73° C) | 1.00 | 1.00 | 1.00 | 1.00 | 1.00 |
| Durene diisocyanate | | 0.12 | | 0.12 | |
| MDI (p,p-diisocyanato diphenyl methane) | | | 1.10 | 0.98 | 0.98 |
| MPDI (meta-phenylene diisocyanate) | 1.10 | 0.98 | | | |
| Total moles of diisocyanate | 1.10 | 1.10 | 1.10 | 1.10 | 0.98 |

The resultant polyurethanes were mixed and compounded as follows:

| Compounding ingredients | Compounded Polyurethanes, parts by weight | | | | |
|---|---|---|---|---|---|
| | A′ | B′ | C′ | D′ | E′ |
| Polyurethane: | | | | | |
| A | 100 | | | | |
| B | | 100 | | | |
| C | | | 100 | | |
| D | | | | 100 | |
| E | | | | | 100 |
| Acrawax-C (dusting agent) | 2 | 2 | 2 | 2 | 2 |
| Carbon black (Easy Process Channel) | 30 | 30 | 40 | 40 | 40 |
| Durene diisocyanate | | | | | 5.8 |

NOTE.—Acrawax-C has a melting point of 140–142° C. and a specific gravity of 0.975.

The compounded polyurethane mixtures were sheeted out and cured in test-specimen molds at 45 minutes at 50 lbs. steam pressure. The physical properties of the polyurethane rubbers were determined without an aging step after the curing under pressure which is generally considered necessary to effect a complete cure. The rubbers were also tested after a final aging step of 40 hours at 250° F., the results of which are shown in Table III, below:

*Table III*

| | Compounded polyurethanes | | | | |
|---|---|---|---|---|---|
| | A′ | B′ | C′ | D′ | E′ |
| Scorch | (¹) | 30′(27–29) | (¹) | 30′(60–60) | 30′(27–27) |
| Cure | 45/50 | 45/50 | 45/50 | 45/50 | 45/50 |
| De Mattia flexes | (²) | (²) | 50,000 | 100,000 | 40,000 |
| Modulus | 600 | 925 | 2,000 | 1,860 | 670 |
| Tensile | 1,775 | 2,425 | 3,930 | 3,100 | 1,140 |
| Elongation | 560 | 660 | 530 | 570 | 520 |
| Tensile-set | 0.53 | .56 | 0.15 | 0.12 | .43 |
| Tear | 135 | 204 | | | |
| Shore "A" | 57 | 60 | 71 | 68 | 66 |
| Aged ³ (hrs./° F.) | 40/250 | 40/250 | 40/250 | 40/250 | 40/250 |
| Modulus | 475 | 1,500 | | 3,200 | |
| Tensile | 1,400 | 3,550 | 3,150 | 4,400 | 1,750 |
| Elongation | 640 | 615 | 260 | 430 | 250 |
| Set | .56 | .18 | .06 | .12 | .09 |
| Tear | 154 | | 256 | 290 | 250 |
| Shore "A" | 56 | 64 | 75 | 76 | 72 |

¹ Too tough for test.   ² Not run.
³ Note that complete cure requires an aging step.

It is noted in the table, the results of the physical tests such as tensile strength conducted after the aging step show that compounded polyurethane compositions B′ and D′ have better physical properties than compositions A′ and C′. It is further observed that properties such as modulus, elongation, tensile strength and processability are outstanding in compositions B′ and D′ which were prepared with a small molar excess of durene diisocyanate. Also the scorch resistance of compositions B′ and D' were excellent. The Mooney viscosity of composition D', for example showed no rise from a minimum of 60 even after being milled for 30 minutes.

A polyurethane was prepared as in Example II, except that 2,4-tolylene diisocyanate was the only diisocyanate used. The 2,4-tolylene diisocyanate was used in the ratio of 1.10 moles of the isocyanate to one mole of the 80/20 poly(ethylene-propylene) adipate. The resultant polymer was soft and sticky and water had to be added in order to mill 100 parts of the polymer with 2 parts Acrawax-C and 40 parts carbon black. The rubbery composition was scorchy and other desirable properties for elastomeric compositions such as elongation and tensile strength were poor.

Although a peroxide curing agent used with a polyurethane elastomer prepared with molar excess of diisocyanate over the polyol usually causes scorchiness and greatly lowered De Mattia flexing crack growth, improved rubbers may be prepared by using a slight molar excess of durene diisocyanate and a dialkyl peroxide curing agent such as dicumyl peroxide. The following example illustrates polyurethane compositions which were cured by excess durene diisocyanate and a peroxide curing agent:

EXAMPLE III

Polyurethanes were prepared as in Example I by reacting the following amounts of polyol and diisocyanate:

|  | Polyurethanes |  |  |  |  |  |  |
| --- | --- | --- | --- | --- | --- | --- | --- |
|  | F | G | H | I | J | K | L |
| Mols polyester (80/20-poly(ethylene propylene) adipate) | 1.00 | 1.00 | 1.00 | 1.00 | 1.00 | 1.00 | 1.00 |
| Total mols diisocyanate | 1.025 | 0.996 | 0.981 | 0.98 | 1.01 | 1.02 | 1.03 |
| Mols durene diisocyanate | 1.025 | 0.996 | 0.981 | 0.13 | 0.16 | 0.17 |  |
| Mols p,p'-diisocyanato diphenyl methane |  |  |  | 0.85 | 0.85 | 0.85 | 1.03 |

The polyurethanes were separately compounded with 2 parts Acrawax-C, 30 parts Easy Process Channel carbon black and 3 parts dicumyl peroxide for 100 parts of the polyurethane gum. The resultant mixtures were cured for 60 minutes at 50 lbs. steam pressure and their physical properties tested as below:

*Table IV*

| Test | ASTM designation | F | G | H | I | J | K | L |
| --- | --- | --- | --- | --- | --- | --- | --- | --- |
| Scorch | D-1077-49T | 30'(18–22) | 30'(17–22) | 30'(15–19) | 30'(13–16) | 30'(15–17) | 30'(14–17) | 8'(62–72) |
| Cure |  | 60'/50# | 60'/50# | 60'/50# | 60'/50# | 60'/50# | 60'/50# | 60'/50# |
| Goodrich flex (212°): | D-623-52T |  |  |  |  |  |  |  |
| ΔT |  | 38° | 39° | 31° |  |  |  | 25° |
| ΔH |  | .018 | .020 | .048 |  |  |  | 0.012 |
| Set |  | 3.8% | 3.5% | 3.7% |  |  |  | 3.2% |
| De Mattia flexes | D-430-51T | .109 | .140 | .125 | .547 | .484 | .453 |  |
|  |  | 100,000 | 100,000 | 100,000 | 100,000 | 100,000 | 100,000 | <1,000 |
| Modulus | D-797-46 | 1,755 | 1,810 | 1,838 | 1,725 | 1,875 | 1,723 | 2,978 |
| Tensile | D-412-51T | 2,960 | 2,900 | 3,300 | 3,450 | 4,025 | 3,850 | 6,149 |
| Elongation | D-412-51T | 410 | 400 | 450 | 480 | 470 | 470 | 460 |
| Set | D-412-51T | .03 | .03 | .03 | .03 | .09 | .06 | .06 |
| Tear | D-624-48 | 123 | 120 | 120 |  |  |  | 172 |
| Shore "A" | D-676-49T | 63 | 64 | 64 | 59 | 60 | 60 | 64 |

As noted in Example III, all the diisocyanate used may be durene diisocyanate or the durene diisocyanate may be used in small molar quantities in the range of .02 to .25 mole per mole of polyol as previously discussed in order to obtain optimum physical properties including lack of appreciable tendency to scorch on the rubber mill. The flexing performances exhibited by durene diisocyanate-polyol rubbers, as indicated by the De Mattia flex test and particularly the Goodrich flexing test in Table IV, were excellent and much better than flexing performances when a diisocyanate such as p,p'-diisocyanate diphenyl methane (polyurethane composition L) is used alone as the sole source of diisocyanate. In addition, composition L was more scorchy than other compositions containing durene diisocyanate rising to a Mooney viscosity reading of 72 from a minimum of 62 in only 8 minutes.

As shown by the results of tests conducted on compositions I, J, and K, the polyurethane rubbers made with small molar amounts of durene diisocyanate used in combination with less than 1 mole of another diisocyanate per mole of polyol exhibit excellent physical properties such as resistance to flexing break, modulus, tensile strength, elongation along with unusual resistance to scorch.

Apparently the presence of alkyl groups or other inhibiting groups such as alkoxy groups which are not reactive with the isocyanate group in a position ortho to the isocyanate groups are partly responsible for the unusual results. While durene diisocyanate is the preferred diisocyanate for providing non-scorching polyurethane rubbers, benefits of the present invention may be obtained with other 2,3,5,6-substituted para phenylene diisocyanates consisting solely of carbon, hydrogen, oxygen and nitrogen atoms and have substituting groups on the 2, 3, 5 and 6 positions comprising saturated aliphatic chains of 1 to 5 carbon atoms such as 2,3,5,6-tetra propyl para phenylene diisocyanate and 2,3,5,6-tetra methoxy para phenylene diisocyanate.

While the above diisocyanates have oxygen atoms, there should be no more than one oxygen atom in each side chain group to obtain the benefits of the present invention. Also, the above diisocyanates have only two oxygen atoms that are terminal atoms in a side chain group appended to the aromatic ring and all of their oxygen atoms are directly connected to carbon atoms and carbon atoms only. The number of nitrogen atoms in the diisocyanate is limited, there being no more than one nitrogen atom per side chain group and all of its nitrogen atoms are directly connected to carbon atoms only. Further, the isocyanate groups are the only side chain groups containing both nitrogen and oxygen atoms.

The 2,3,5,6-substituted para phenylene diisocyanates may be represented by the following general formula:

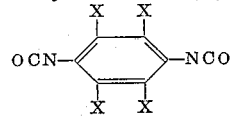

where X is an alkyl group of 1 to 5 carbon atoms such as methyl, ethyl, isopropyl, propyl, butyl, tertiary butyl, pentyl, neopentyl and the like or where X is an alkoxy group of 1 to 5 carbon atoms, or a dialkylamino group in which the alkyl radicals have from 1 to 5 carbon atoms or mixtures of the above inhibiting groups. Examples of such isocyanates are 2,3,5,6-tetra ethyl para phenylene diisocyanate, 2,3,5,6-tetra tertiary butyl para phenylene diisocyanate, 2,3,5,6-tetra ethoxy para phenylene diisocyanate, 2,6-dimethyl-3,5-diethoxy para phenylene diisocyanate, 2,6-di(diethyl amino)-3,5-dipropyl para phenylene diisocyanate and 2,3,5,6-tetra (dimethyl amino) para phenylene diisocyanate.

The above isocyanates may be substituted in whole or in part for durene diisocyanate in the preceding examples while still retaining a very susbtantial portion of the benefits there obtained.

A disadvantage of polyester-urethane materials has been their lack of resistance to moisture especially at elevated temperatures. When both moisture resistant and non-scorching polyester urethane compositions are desired, a 2,3,5,6-substituted para phenylene diisocyanate as herein described such as durene diisocyanate should be used to form the composition in amounts of at least .06 to .07 weight equivalent per equivalent of polyester and best results are obtained with .1 to .2 equivalent when a diisocyanate other than durene diisocyanate is used for the balance of the diisocyanate mixture. In addition the total amount of polyisocyanate should be at least 1.02 equivalents of isocyanate per equivalent of polyester and preferably at least 1.1 equivalents. As previously described, the total amount of polyisocyanate used should not exceed 1.3 equivalents unless millable, calenderable properties are not required in the composition, in which case, 1.4 or even up to 1.5 equivalents of isocyanate per equivalent of polyester may be used.

It is to be understood that in accordance with the provisions of the patent statues, the particular form of product shown and described and the particular procedure set forth are presented for purposes of explanation and illustration and that various modifications of said product and procedure can be made without departing from our invention.

Having described our invention, what we claim is:

1. A composition comprising (I) a polyurethane of (1) one mole of at least one polyol having terminal hydroxy groups and having a molecular weight of at least about 500 and being selected from the group consisting of (A) a polyester containing ester linkages between chains of carbon atoms, having an acid number of less than 60, consisting essentially of carbon, hydrogen and oxygen and being the reaction product of an organic polycarboxylic acid and an organic polyhydric alcohol, and (B) a poly (alkylene ether) polyol containing ether oxygen atoms between chains of carbon atoms, and consisting essentially of carbon, hydrogen and oxygen, said polyols (A) and (B) each being free of epoxy groups and of vinyl alcohol groups, and (2) from about 0.95 to 1.50 total moles of a mixture of at least two different organic polyisocyanates having two readily reactive isocyanato groups, at least 0.02 mole of the total moles of said polyisocyanate mixture being a tetra substituted diisocyanate having the formula

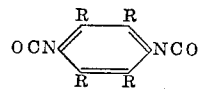

where R is an alkyl radical of from 1 to 5 carbon atoms to reduce scorch of said polyurethane, and (II) from about 0.5 to 8% by weight of said polyurethane of an organic peroxide curing agent for the same, said organic peroxide curing agent being free of acyl groups, being free of hydroperoxy groups, and having a tertiary aliphatic carbon atom attached to a peroxide oxygen atom, which carbon atom is not directly connected to any other oxygen atom.

2. A composition comprising (I) a polyurethane of (1) one mole of at least one polyol having terminal hydroxyl groups and having a molecular weight of at least about 1000 and being selected from the group consisting of (A) a polyester containing ester linkages between chains of carbon atoms, having an acid number of less than 60, consisting essentially of carbon, hydrogen and oxygen, and being the reaction product of an organic polycarboxylic acid and an organic polyhydric alcohol, and (B) a poly (alkylene ether) polyol containing ether oxygen atoms between chains of carbon atoms, and consisting essentially of carbon, hydrogen and oxygen, said polyols (A) and (B) each being free of epoxy groups and of vinyl alcohol groups, with (2) from about 0.95 to 1.50 total moles of a mixture of at least two different aromatic diisocyanates having two readily reactive isocyanato groups, from 0.02 to 0.25 mole of the total moles of said diisocyanate mixture being a tetra substituted diisocyanate having the formula:

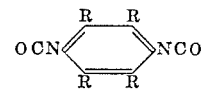

where R is an alkyl radical of from 1 to 5 carbon atoms to reduce scorch of said polyurethane, and (II) from about 0.5 to 8% by weight of said polyurethane of an organic peroxide curing agent for the same, said organic peroxide curing agent being free of acyl groups, being free of hydroperoxy groups, and having a tertiary aliphatic carbon atom attached to a peroxide oxygen atom, which carbon atom is not directly connected to any other oxygen atom.

3. A rubbery polyesterurethane comprising a vulcanizate of (I) the reaction product of (1) one mole of a substantially linear polyester having a molecular weight of from about 1000 to 4000, essentially terminal hydroxyl radicals and an acid number less than one and being the reaction product of a saturated aliphtic glycol and a saturated aliphatic dicarboxylic acid, with (2) from about 0.97 to 1.50 total moles of a mixture of at least two different aromatic disocyanates having two readily reactive isocyanato groups, from about 0.02 to 0.25 mole of the total moles of said aromatic diisocyanate mixture being a tetra substituted diisocyanate having the formula:

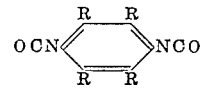

where R is an alkyl radical of from 1 to 5 carbon atoms to reduce scorch of said polyesterurethane, and (II) from about 0.5 to 8% by weight of said reaction product of an organic peroxide curing agent for the same, said organic peroxide curing agent being free of acyl groups, being free of hydroperoxy groups, and having a tertiary aliphatic carbon atom attached to a peroxide oxygen atom, which carbon atom is not directly connected to any other oxygen atom.

4. A cured, rubbery polyesterurethane comprising (I) the reaction product of (1) one mole of a substantially linear polyester having a molecular weight of from about 1000 to 3000, essentially terminal hydroxyl radicals, and an acid number of less than one and being the reaction product of a saturated aliphatic glycol and a saturated aliphatic dicarboxylic acid, with (2) from about 0.97 to to 1.50 total moles of a mixture of at least two different aromatic diisocyanates having two readily reactive isocyanato groups, from 0.02 to 0.25 mole of the total moles of said aromatic diisocyanate mixture being a tetra substituted diisocyanate having the formula:

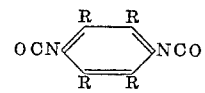

where R is an alkyl radical of from 1 to 5 carbon atoms to reduce scorch of said polyesterurethane, (II) from about 0.5 to 8% by weight of said reaction product of an organic peroxide curing agent for the same, said organic peroxide curing agent being free of acyl groups, being free of hydroperoxy groups, and having a tertiary aliphatic carbon atom attached to a peroxide oxygen atom, which carbon atom is not directly connected to any other oxygen atom, and (III) from about 15 to 50 parts by weight of carbon black per 100 parts of said reaction product.

5. A cured, rubbery polyesterurethane according to claim 4 in which said tetrasubstituted diisocyanate is 2,3,5,6-tetramethyl-p-phenylene diisocyanate.

6. A cured, rubbery polyesterurethane according to claim 4 in which said tetrasubstituted diisocyanate is 2,3,5,6-tetraethyl-p-phenylene diisocyanate.

7. A cured, rubbery polyesterurethane according to claim 4 in which said tetrasubstituted diisocyanate is 2,3,5,6-tetraisopropyl-p-phenylene diisocyanate.

8. A cured, rubbery polyesterurethane according to claim 4 in which said tetrasubstituted diisocyanate is 2,3,5,6-tetratertiary-butyl-p-phenylene diisocyanate.

9. A rubbery polyetherurethane comprising a vulcanizate of (I) the reaction product of (1) one mole of a substantially linear poly(alkylene ether) glycol having a molecular weight of from about 1000 to 4000, terminal hydroxyl radicals and ether oxygen atoms between carbon chains, with (2) from about 0.97 to 1.50 total moles of a mixture of at least two different aromatic diisocyanates having two readily reactive isocyanato groups, from about 0.02 to 0.25 mole of the total moles of said aromatic diisocyanate mixture being a tetra substituted diisocyanate having the formula

where R is an alkyl radical of from 1 to 5 carbon atoms to reduce scorch of said polyether urethane, and (II) from about 0.5 to 8% by weight of said reaction product of an organic peroxide curing agent for the same, said organic peroxide curing agent being free of acyl groups, being free of hydroperoxy groups, and having a tertiary aliphatic carbon atom attached to a peroxide oxygen atom, which carbon atom is not directly connected to any other oxygen atom.

10. A cured, rubbery polyetherurethane comprising (1) the reaction product of (1) one mole of a substantially linear poly-(alkylene ether) glycol having a molecular weight of from about 1000 to 4000, essentially terminal hydroxyl radicals and ether oxygen atoms between carbon chains, with (2) from about 0.97 to 1.50 total moles of a mixture of at least two different aromatic diisocyanates having two readily reactive isocyanato groups, from about 0.02 to 0.25 mole of the total moles of said diisocyanate mixture being a tetra substituted diisocyanate having the formula:

where R is an alkyl radical of from 1 to 5 carbon atoms to reduce scorch of said polyether urethane, and (II) from about 0.5 to 8.0% by weight of said reaction product of an organic peroxide curing agent for the same, said organic peroxide curing agent being free of acyl groups, being free of hydroperoxy groups, and having a tertiary aliphatic carbon atom attached to a peroxide oxygen atom, which carbon atom is not directly connected to any other oxygen atom, and (III) from about 5 to 80 parts by weight of carbon black per 100 parts of said reaction product.

11. A cured, rubbery polyetherurethane according to claim 10 in which said tetrasubstituted diisocyanate is 2,3,5,6-tetra-methyl-p-phenylene diisocyanate.

References Cited in the file of this patent

UNITED STATES PATENTS

| | | |
|---|---|---|
| 2,740,743 | Pace | Apr. 3, 1956 |
| 2,853,472 | Schroeder et al. | Sept. 23, 1958 |
| 2,858,296 | Stilmar | Oct. 28, 1958 |
| 2,904,535 | Milka | Sept. 15, 1959 |
| 2,906,738 | Goldberg | Sept. 29, 1959 |

OTHER REFERENCES

Windemuth et al.: German application Ser. No. F16,475, printed July 5, 1956 (Kl. 39b 22–04) (3 pages spec., no dwrg.).

Hercules Powder Co., technical data sheet "Dicumyl Peroxide (DCP)," Technical Service Division, Naval Stores Dept., Wilmington 99, Delaware, Feb. 1, 1954.

Shell Development Co., Emeryville, Calif., preliminary information sheet, PI–4r–11/55, "Durenediisocyanate (DDIC)," Nov. 30, 1955.

Hill et al.: Ind. Chem., 48, 927–33 (May 1956).